US009686685B2

(12) United States Patent
Shin et al.

(10) Patent No.: US 9,686,685 B2
(45) Date of Patent: Jun. 20, 2017

(54) METHOD OF REINFORCING SECURITY OF BEACON DEVICE, AND SYSTEM AND APPARATUS THEREOF

(71) Applicant: SK PLANET CO., LTD., Gyeonggi-do (KR)

(72) Inventors: Chulyong Shin, Seoul (KR); Jaehyung Huh, Gyeonggi-do (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 49 days.

(21) Appl. No.: 14/626,485

(22) Filed: Feb. 19, 2015

(65) Prior Publication Data
US 2015/0271676 A1 Sep. 24, 2015

(30) Foreign Application Priority Data

Mar. 21, 2014 (KR) .................. 10-2014-0033280

(51) Int. Cl.
*H04L 29/06* (2006.01)
*H04W 12/08* (2009.01)
(Continued)

(52) U.S. Cl.
CPC ............ *H04W 12/08* (2013.01); *G06F 21/31* (2013.01); *H04W 4/008* (2013.01); *H04W 12/06* (2013.01);
(Continued)

(58) Field of Classification Search
None
See application file for complete search history.

(56) References Cited

U.S. PATENT DOCUMENTS 7,483,984 B1 * 1/2009 Jonker .................... H04L 41/22
709/203
8,321,922 B1 * 11/2012 Lo ........................... G06F 21/43
455/411
(Continued)

OTHER PUBLICATIONS

Lee, Seungbeom; Park, Sin-Chong. Performance Evaluation of Bluetooth using Intereference-Detection-Based Frequency Hopping. The 57th IEEE Seminannual Vehicular Technology Conference. Pub. Date: 2003. http://ieeexplore.ieee.org/stamp/stamp.jsp?arnumber=1208845.*
(Continued)

*Primary Examiner* — Jeremiah Avery
(74) *Attorney, Agent, or Firm* — Fenwick & West LLP

(57) ABSTRACT

Provided are a method of reinforcing the security of a beacon device and a system and apparatus thereof. In particular, the stability of security is increased by performing user authentication and encrypting data during communication with a beacon device, so that identification information of the beacon device may be changed by establishing Bluetooth Low Energy (BLE) communication after the beacon device and a terminal are connected. Also, a user can be exactly identified using a beacon signal and authenticated, thereby conveniently providing additional services. Also, the location of a terminal may be determined using a BLE beacon signal terminal to reduce resources consumed to measure the location of the terminal. A service device may simplify logic for extracting information to be applied to a service. That is, when various information is provided to a client's terminal that receives an identifier of a beacon device broadcast from the beacon device, information provided to the client's terminal may be prevented from being changed by an unauthorized person.

9 Claims, 13 Drawing Sheets

(51) Int. Cl.
  *H04W 4/00* (2009.01)
  *H04W 12/06* (2009.01)
  *G06F 21/31* (2013.01)
  *H04W 12/04* (2009.01)
  *H04W 12/02* (2009.01)

(52) U.S. Cl.
  CPC ...... *H04L 63/0428* (2013.01); *H04L 63/0442* (2013.01); *H04W 12/02* (2013.01); *H04W 12/04* (2013.01)

(56) References Cited

U.S. PATENT DOCUMENTS

| | | | | |
|---|---|---|---|---|
| 9,594,896 | B2 * | 3/2017 | Rosati | G06F 21/44 |
| 2005/0154925 | A1 * | 7/2005 | Chitrapu | H04L 9/3234 |
| | | | | 726/19 |
| 2014/0344420 | A1 * | 11/2014 | Rjeili | H04L 43/04 |
| | | | | 709/220 |
| 2015/0071139 | A1 * | 3/2015 | Nix | H04W 52/0235 |
| | | | | 370/311 |
| 2015/0120504 | A1 * | 4/2015 | Todasco | G06Q 20/322 |
| | | | | 705/26.61 |
| 2015/0177006 | A1 * | 6/2015 | Schulz | G01C 21/3407 |
| | | | | 701/537 |
| 2015/0178698 | A1 * | 6/2015 | Schulz | G06Q 20/145 |
| | | | | 705/13 |

OTHER PUBLICATIONS

Suresh, T.; Henry, Joseph; Rangarajan, P. Multi-agent based Reconfigurable Architecture for Future Wireless Networks. International Conference on Intelligent Agent & Multi-Agent Systems. Pub. Date: 2009. http://ieeexplore.ieee.org/stamp/stamp.jsp?arnumber=5228078.*

* cited by examiner

METHOD OF REINFORCING SECURITY OF BEACON DEVICE, AND SYSTEM AND APPARATUS THEREOF

CROSS-REFERENCE TO RELATED APPLICATION

This application claims priority to and the benefit of Korean Patent Application No. 10-2014-0033280 filed in the Korean Intellectual Property Office on Mar. 21, 2014, the entire contents of which are incorporated herein by reference.

TECHNICAL FIELD

The present invention relates to a method of reinforcing the security of a beacon device and a system and apparatus thereof, and more particularly, to a method of reinforcing the security of a beacon device, which is capable of increasing the stability of the security of the beacon device by performing user authentication and encrypting data during communication with the beacon device, and a system and apparatus thereof.

BACKGROUND

With advances in mobile communication networks and terminal specifications, mobile communication terminals which were used merely as communication devices or information providing devices have become modern people's most indispensable items and are tending to evolve into total entertainment devices.

Such a mobile communication terminal has not only a communication function using a mobile communication network but also a function of performing local area wireless communication such as near field communication (NFC), Bluetooth, etc.

However, NFC has a short communication distance and additionally requires a wireless chip for communication, whereas Bluetooth has a relatively long communication distance and various Bluetooth-based communication services have been developed since a Bluetooth communication function is included in most terminals.

Also, services providing various information to a user's mobile communication terminal using a beacon using Bluetooth communication have been developed. In this case, the mobile communication terminal receives a corresponding beacon identifier from the beacon and uses the beacon identifier to obtain various information.

However, when service information used to establish Bluetooth Low-Energy (BLE) communication is obtained to change information regarding the beacon using a beacon management application, an unauthorized user can change the information regarding the beacon, thereby causing security problems to occur.

PRIOR ART DOCUMENT

Patent Document

Korean Laid-open Patent Publication No. 10-2013-0030451A, entitled "Apparatus and Method for Reinforcing Security for Network Access" (publication date: Mar. 27, 2013)

SUMMARY

The present invention is designed to solve a security problem that beacon information can be changed by an unauthorized user when service information used for Bluetooth Low-Energy (BLE) communication is obtained to change the beacon information using a conventional beacon management application, and is directed to a method of reinforcing the security of a beacon device, which is capable of increasing the stability of security by performing user authentication and encrypting data during communication with the beacon device, and a system and apparatus thereof.

One aspect of the present invention provides a terminal including a communication unit configured to communicate with at least one beacon device and a service device to transmit or receive data required to reinforce the security of a beacon device; and a controller configured to control a beacon management application to be executed, an access token to be received from the beacon device, a public key for the beacon device to be requested while identifying the beacon device and transmitting the access token and user information to the service device, the access token to be encrypted using the public key received from the service device, and the encrypted access token to be transmitted to the beacon device.

The controller may perform user authentication, search for a list of at least one beacon device permitted after the user authentication, select a specific beacon device from the list of at least one beacon device, set broadcasting information of the selected beacon device, and activate a communication function by setting wireless Internet client information with the service device.

The communication unit may receive a beacon signal using Bluetooth low energy (BLE).

The controller may identify at least one among a universally unique identifier (UUID) of the beacon device, a major value representing a group to which the beacon device belongs, and a minor value identifying the beacon device in the group to which the beacon device belongs so as to reinforce the security of the beacon device.

Another aspect of the present invention provides a service device including a service communication unit configured to communicate with at least one terminal and a beacon device to transmit or receive data required to reinforce the security of the beacon device; and a service controller configured to control a request to transmit an access token to be received from the beacon device, the access token to be generated and transmitted to the beacon device in response to the request, at least one of the access token and user information to be received from the at least one terminal, and a public key to be generated and transmitted to the at least one terminal in response to a request when a signal requesting the public key for the beacon device is received.

The access token may include information required for the at least one terminal and the beacon device to log in.

Another aspect of the present invention provides a system for reinforcing the security of a beacon device, the system including a terminal configured to execute a beacon management application, receive an access token from a beacon device, request a service device to transmit a public key for the beacon device while identifying the beacon device and transmitting the access token and user information to the service device, encrypt the access token using the public key received from the service device, and transmit the encrypted access token to the beacon device; the beacon device configured to request the service device to transmit an access token, receive the access token from the service device, transmit the received access token to the terminal, determine whether an encrypted access token is received from the terminal, and verify whether the access token is valid by decrypting the encrypted access token using a private key when the encrypted access token is received; and the service device configured to receive a request to transmit an access token from the beacon device, generate the access token and transmit the access token to the beacon device in response to the request, receive at least one access token and user information from the terminal, and generate a public key for the beacon device and transmit the generated public key to the terminal in response to a request when a signal requesting the public key for the beacon device is received.

Another aspect of the present invention provides a method of reinforcing the security of a beacon device by a terminal, the method including performing user authentication, searching for a list of at least one beacon device permitted after the user authentication, selecting a specific beacon device from the list of at least one beacon device, setting broadcasting information of the selected beacon device, and activating a communication function by setting wireless Internet client information with a service device.

Another aspect of the present invention provides a method of reinforcing security of a beacon device by a terminal, the method including executing a beacon management application, receiving an access token from at least one beacon device, identifying a beacon device, requesting a service device to transmit a public key for the beacon device while transmitting the access token and user information to the service device, encrypting the access token using the public key received from the service device, and transmitting the encrypted access token to the beacon device.

The method may further include accessing the beacon device after the identifying of the beacon device.

The method may further include transmitting information for changing a predetermined beacon value to the beacon device, and disabling the access to the beacon device when the predetermined beacon value is changed, after the transmitting of the encrypted access token to the beacon device.

Another aspect of the present invention provides a method of reinforcing the security of a beacon device by the beacon device, the method including requesting a service device to transmit an access token, receiving the access token from the service device and transmitting the received access token to at least one terminal, determining whether an encrypted access token is received from the at least one terminal, and verifying whether the access token is valid by decrypting the encrypted access token using a private key when the encrypted access token is received.

The method may further include accessing a terminal after the transmitting the received access token to at least one terminal.

The method may further include receiving information for changing a predetermined beacon value from the terminal, changing the predetermined beacon value based on this information, and disabling the access to the terminal when the predetermined beacon value is changed, after the verifying of whether the access token is valid.

Another aspect of the present invention provides a method of reinforcing the security of a beacon device by a service device, the method including receiving a request to transmit an access token from at least one beacon device, generating an access token and transmitting the generated access token to a beacon device in response to the request, receiving at least one access token and user information from at least one terminal and receiving a signal requesting a public key for a beacon device, and generating the public key and transmitting the generated public key to a terminal in response to the request.

Another aspect of the present invention provides a non-transitory computer readable recording medium recording a program causing to perform performing user authentication, searching for a list of at least one beacon device permitted after the user authentication, selecting a specific beacon device from the list of at least one beacon device, setting broadcasting information of the selected beacon device, and activating a communication function by setting wireless Internet client information with a service device.

Another aspect of the present invention provides a non-transitory computer readable recording medium recording a program causing to perform executing a beacon management application, receiving an access token from at least one beacon device, identifying a beacon device, requesting a service device to transmit a public key for the beacon device while transmitting the access token and user information to the service device, encrypting the access token using the public key received from the service device, and transmitting the encrypted access token to the beacon device.

Another aspect of the present invention provides a non-transitory computer readable recording medium recording a program causing to perform requesting a service device to transmit an access token, receiving the access token from the service device and transmitting the received access token to at least one terminal, determining whether an encrypted access token is received from the at least one terminal, and verifying whether the access token is valid by decrypting the encrypted access token using a private key when the encrypted access token is received.

Another aspect of the present invention provides a non-transitory computer readable recording medium recording a program causing to perform receiving a request to transmit an access token from at least one beacon device, generating an access token and transmitting the generated access token to a beacon device in response to the request, receiving at least one access token and user information from at least one terminal and receiving a signal requesting a public key for a beacon device, and generating the public key and transmitting the generated public key to a terminal in response to the request.

According to the present invention, identification information of a beacon device may be changed by establishing BLE communication after the beacon device and a terminal are connected to each other.

Also, a user may be exactly identified using a beacon signal and authenticated, thereby conveniently providing additional services.

Also, the location of a terminal may be determined using a BLE beacon signal to reduce resources consumed to measure the location of the terminal. A service device may simplify logic for extracting information to be applied to a service.

Also, when various information is provided to a client's terminal that receives an identifier of a beacon device broadcast from the beacon device, information provided to the client's terminal may be prevented from being changed by an unauthorized person.

That is, the security of the beacon device is reinforced to enable only an authorized user to change information of the beacon device, thereby blocking access to the beacon device by a malicious person and providing a safe service.

DETAILED DESCRIPTION

Figure 1:
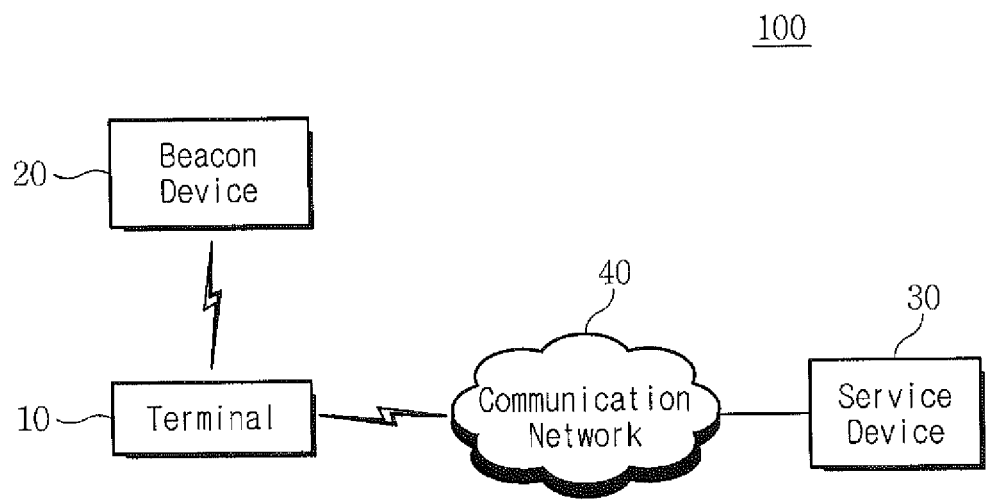
FIG. 1 is a diagram illustrating a structure of a system for reinforcing security of a beacon device according to an embodiment of the present invention.

Hereinafter, exemplary embodiments of the present invention will be described in detail with reference to the accompanying drawings. In the following description and the appended drawings, detailed descriptions of well-known functions or constructions will be omitted if they would obscure the invention in unnecessary detail. The same elements are denoted by the same reference numerals throughout the drawings if possible.

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustration only and not intended to limit the scope of the invention, so it should be understood that other equivalents and modifications could be made thereto without departing from the spirit and scope of the invention.

The following description is provided to explain exemplary embodiments of the present invention with reference to the accompanying drawings and is not intended to provide only one embodiment in which the present invention is implemented. In the following description, detailed particulars of the present invention are provided for better understanding of the present invention. However, it would be obvious to those of ordinary skill in the art in the technical field to which the invention pertains that the present invention can be implemented without such detailed particulars.

In some cases, well-known constructions and devices may not be described in detail or may be described using a block diagram illustrating the structure and main functions of each element if it is determined that they would obscure the invention due to unnecessary detail Throughout the present disclosure, it will be understood that the terms "comprise" and "include," specify the presence of stated features, integers, steps, operations, elements, and/or components, but do not preclude the presence or addition of one or more other features, integers, steps, operations, elements, components, and/or groups thereof. As used herein, the terms "unit", "element", "module", etc. should be understood as units in which at least one function or operation is performed and which may be embodied in the form of hardware, software, or a combination of hardware and software. Also, the singular forms "a", "an," and "the" are intended to include the plural forms as well, unless the context (particularly, the context of the claims appended herein) clearly indicates otherwise.

In addition, the specific terms used in the present disclosure are only used for a better understanding of the present invention. It will be understood by those of ordinary skill in the art that various changes in form and details may be made without departing from the spirit and scope of the invention as defined by the appended claims.

In the following description, although a mobile communication terminal which is connected to a communication network and capable of providing a service for reinforcing security of a beacon device has been described as a representative example of a terminal according to an embodiment of the present invention, the terminal is not limited to the mobile communication terminal and may be any of various terminals, e.g., information communication devices, multimedia terminals, wire terminals, fixed type terminals, Internet protocol (IP) terminals, etc. Also, the present invention is advantageously applicable to the terminal when the terminal is one of various mobile terminals having mobile communication specifications, such as a mobile phone, a portable multimedia player (PMP), a mobile Internet device (MID), a smartphone, a desktop computer, a tablet personal computer (PC), a notebook computer, a net book, an information communication device, etc.

Herein, the beacon applied to a mobile communication terminal according to the present invention is data communication technology using Bluetooth Low-Energy (BLE), having a Bluetooth function which is a precise GPS function, and enabling a distance from 5 cm to 49 cm to be sensed, compared to NFC that can be used within a limited distance of 10 cm or less. Thus, the range of application fields of the beacon is far wider than the range of application fields of the NFC. In the case of the beacon, a smartphone need not be tagged by bring it close to a reader unlike in the case of the NFC, data can be transmitted simply when a user with the smartphone passes by a place in which the beacon is installed, and detailed location information can be read to transmit customized data even in a building.

A system for reinforcing security of a beacon device according to an embodiment of the present invention will now be described.

FIG. 1 is a diagram illustrating a structure of a system 100 for reinforcing security of a beacon device according to one embodiment of the present invention.

Referring to FIG. 1, the system 100 according to an embodiment of the present invention includes a terminal 10, a beacon device 20, a service device 30, and a communication network 40.

A processor installed in each of the terminal 10, the beacon device 20, and the service device 30 according to an embodiment of the present invention is capable of executing program commands for performing a method according to an embodiment of the present invention. The processor may be a single-threaded processor in one embodiment and may be a multi-threaded processor in another embodiment. Furthermore, the processor is capable of executing a command stored in a memory or a storage device.

A series of data transmission and receiving operations may be performed via the communication network 40 to exchange data and information among the terminal 10, the beacon device 20, and the service device 30. In particular, the communication network 40 may be any of various types of communication networks. For example, a wireless communication method, such as a wireless local area network (WLAN), Wi-Fi, Wibro, Wimax, high-speed downlink packet access (HSDPA), etc., or a wired communication method, such as Ethernet, xDSL (ADSL, VDSL, etc.), hybrid fiber coax (HFC), fiber-to-the-curb (FTTC), fiber-to-the-home (FTTH), etc., may be used. However, the communication network 40 is not limited thereto and may include other various communication methods that are well-known or that will be developed in the near future.

The terminal 10 communicates with the beacon device 20 and the service device 30 via the communication network 40 to transmit or receive data to be used to reinforce the security of the beacon device 20. In particular, the terminal 10 according to an embodiment of the present invention receives a beacon signal from the beacon device 20 and analyzes the beacon signal to extract beacon identification information from the beacon signal. The terminal 10 transmits the extracted beacon identification information to the service device 30. In this case, user information has been stored in the terminal 10. The user information includes at least one of the name of the user of the terminal 10 and terminal identification information. For example, the terminal identification information may include at least one among international mobile station equipment identity (IMEI), an electronic serial number (ESN), and a mobile identification number (MDN).

The terminal 10 performs user authentication and searches for a list of beacon devices permitted after the user authentication. The terminal 10 selects a specific beacon device from the list of beacon devices and sets broadcasting information of the selected beacon device. Thereafter, the terminal 10 activates a communication function by setting wireless Internet client information with the service device 30.

According to another embodiment of the present invention, the terminal 10 executes a beacon management application. Also, the terminal 10 receives an access token from the beacon device 20, identifies the beacon device 20 to set access to the beacon device 20, and requests the service device 30 to provide an access token. Here, the access token includes information required for the terminal 10 and the beacon device 20 to log in. Thereafter, the terminal 10 encrypts the access token using a public key received from the service device 30 and transmits the encrypted access token to the beacon device 20.

The terminal 10 transmits information for changing a predetermined beacon value to the beacon device 20, and disables the access to the beacon device 20 when the predetermined beacon value is changed.

The beacon device 20 emits a beacon signal via wireless communication to enable the terminal 10 to perform a location survey. In detail, the beacon device 20 emits the beacon signal through wireless local area communication. The beacon device 20 may emit the beacon signal using BLE, but the present invention is not limited thereto and the beacon signal may be emitted using Radio Frequency Identification (RFID), Zigbee, near-field communication (NFC), etc.

The beacon signal emitted from the beacon device 20 includes beacon identification information for identifying the beacon device 20. The beacon identification information included in the beacon signal may include at least one among a Universally Unique IDentifier (UUID) of the beacon device 20, a major value representing a group of beacon devices, and a minor value for identifying a specific beacon device in the group of beacon devices.

According to an embodiment of the present invention, the beacon device 20 may be installed in a specific store. In this case, the beacon device 20 may emit a beacon signal with respect to a certain region of the specific store to measure location of the terminal 10 in the specific store. According to another embodiment of the present invention, the beacon device 20 may be installed outside a store. In this case, the beacon device 20 emits a beacon signal with respect to a certain region close to the store to measure location of the terminal 10 of a user who visits the store, based on a drive-through method or the like.

Also, according to an embodiment of the present invention, the beacon device 20 requests the service device 30 to provide an access token and receives the access token from the service device 30. Next, the beacon device 20 transmits the access token to the terminal 10. Then, the beacon device 20 accesses the terminal 10.

The beacon device 20 determines whether an encrypted access token is received from the terminal 10. When the encrypted access token is received from the terminal 10, the beacon device 20 decrypts the encrypted access token using a private key to verify whether the access token is valid.

When the beacon device 20 receives information for changing a predetermined beacon value from the terminal 10, the beacon device 20 changes the predetermined beacon value based on this information. Here, the beacon device 20 may change the predetermined beacon value, such as the major value, the minor value, transmission power, an advertisement period, Wi-Fi client information, etc. The beacon device 20 disables the access to the terminal 10 when the predetermined value is changed.

The service device 30 communicates with the terminal 10 and the beacon device 20 via the communication network 40 to transmit or receive data to be used to reinforce the security of the beacon device 20. In particular, according to an embodiment of the present invention, the service device 30 receives a request to transmit an access token from the beacon device 20. Also, the service device 30 generates the access token and transmits the access token to the beacon device 20 in response to the request, and receives at least one access token and user information from the terminal 10.

When the service device 30 receives a signal requesting a public key for the beacon device 20, the service device 30 generates the public key in response to the request. Then, the service device 30 transmits the public key to the terminal 10.

That is, according to an embodiment of the present invention, an access token for reinforcing security is issued, and the access token and data that is to be used for BLE communication are encrypted and decrypted using a Rivest Shamir Adleman (RSA) algorithm based on a public key and a private key. Also, when a beacon device is initially distributed, an access token and a public key may be registered to a beacon and a service device in order to provide a seamless service.

Thus, according to an embodiment of the present invention, after a beacon device and a terminal are connected, BLE communication may be established to change identification information of the beacon device. Also, a user may be exactly identified using a beacon signal and authenticated, thereby conveniently providing additional services. Also, the location of a terminal is measured using a BLE beacon signal to reduce resources consumed to measure the location of the terminal. A service device may simplify logic for extracting information to be used for a service. Also, when various information is provided to a client's terminal that receives an identifier of a beacon device broadcast from the beacon device, information provided to the client's terminal may be prevented from being changed by an unauthorized person. That is, the security of the beacon device is reinforced to enable only an authorized user to change information of the beacon device, thereby blocking access to the beacon device by a malicious person and providing a safe service.

The process of reinforcing the security of a beacon device according to an embodiment of the present invention described above will be described in more detail with reference to FIGS. 2 to 10D below.

Figure 2:
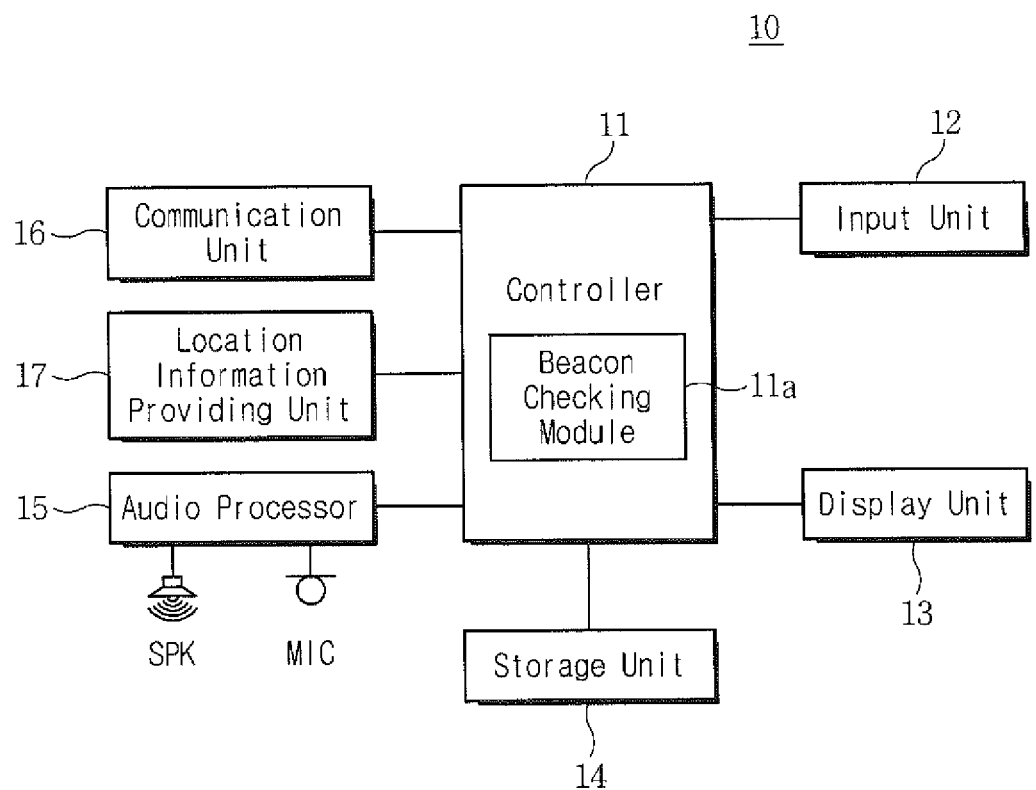
FIG. 2 is a block diagram of a terminal according to an embodiment of the present invention.

FIG. 2 is a block diagram of a terminal 10 according to an embodiment of the present invention.

Referring to FIG. 2, the terminal 10 according to an embodiment of the present invention includes a controller 11, an input unit 12, a display unit 13, a storage unit 14, an audio processor 15, a communication unit 16, and a location information providing unit 17. The controller 11 includes a beacon checking module 11a.

The input unit 12 receives various information such as numbers and character information, sets various functions, and transmits a signal input related to controlling a function of the terminal 10 to the controller 11. Also, the input unit 12 may include at least one of a keypad and a touch pad used to generate an input signal according to a user's touch or manipulation. In this case, the input unit 12 forms one touch panel (or a touch screen) together with the display unit 13 to simultaneously perform an input operation and a display operation. Also, the input unit 12 may be a keyboard, a keypad, a mouse, a joystick, or other various types of input units that will be developed in the near future. In particular, the input unit 12 according to an embodiment of the present invention senses an input signal for performing user authentication from a user and an input signal for accessing the beacon device 20, and transmits the input signals to the controller 11.

The display unit 13 displays information regarding the states of and results of performing a series of operations generated when a function of the terminal 10 is performed. Also, the display unit 13 may display a menu of the terminal 10, user data input by a user, etc. Here, the display unit 13 may be a liquid crystal display (LCD), a thin film transistor LCD (TFT-LCD), a light-emitting diode (LED), an organic LED (OLED), an active matrix OLED (AMOLED), a retina display, a flexible display, a three-dimensional (3D) display, etc. When the display unit 13 is embodied in the form of a touch screen, the display unit 13 may perform a part of or all of the operations of the input unit 12. In particular, the display unit 13 according to an embodiment of the present invention outputs a screen image for user authentication, etc.

The storage unit 14 is a device configured to store data, includes a main storage device and an auxiliary storage device, and stores application programs for performing functions of the terminal 10. The storage unit 14 may be largely divided into a program region and a data region. Here, when the functions of the terminal 10 are activated in response to a user's request, the terminal 10 executes the corresponding application programs and provides a result of performing the functions, under control of the controller 11. In particular, the storage unit 14 according to an embodiment of the present invention stores an operating system (OS) for booting the terminal 10, a program for performing user authentication, a program for identifying the beacon device 20, etc. The storage unit 14 further stores user information, beacon identification information, etc. Here, the beacon identification information includes at least one among a UUID, beacon group information, identification information of a specific beacon device in a beacon group, and member identification. The user information includes at least one of the name of a user and terminal identification information.

The audio processor 15 transmits to the controller 11 an audio signal received from one of a speaker SPK and a microphone MIC that are configured to reproduce and output an audio signal. The audio processor 15 may convert an audio signal, which is input in the form of an analog signal via the microphone MIC, into a digital signal and transmit the converted audio signal to the controller 11. Also, the audio processor 15 may convert an audio signal, which is output in the form of a digital signal from the controller 11, into an analog signal and output the converted audio signal via the speaker SPK. In particular, the audio processor 15 according to an embodiment of the present invention outputs sound effects or execution sound generated during a process of reinforcing security.

The communication unit 16 performs an operation of transmitting/receiving data for reinforcing the security of the beacon device 20 via the communication network 40. Here, the communication unit 16 includes an RF transmission unit that increases the frequency of a transmitted signal and amplifies the transmitted signal, an RF receiving unit that low-noise amplifies a received signal and decreases the frequency of the received signal, etc. The communication unit 16 may include at least one of a wireless communication module (not shown) and a wired communication module (not shown). The wireless communication module is configured to transmit/receive data according to a wireless communication method. When the terminal 10 employs wireless communication, data may be transmitted to or received from the service device 30 using one of a wireless network communication module, a wireless LAN communication module, and a wireless personal area network (PAN) communication module. The wired communication module is configured to transmit/receive data via a wire. The wired communication module may be connected to the communication network 40 via the wire to transmit data or receive data from the service device 30. In particular, the communication unit 16 according to an embodiment of the present invention communicates with the beacon device 20 and the service device 30 to transmit data thereto or receive data therefrom. In this case, the communication unit 16 receives a beacon signal using BLE.

The location information providing unit 17 determines the latitude, longitude, and current location information of the terminal 10 by receiving a global positioning system (GPS) signal from at least one GPS satellite, and transmits the latitude, the longitude, and the current location information of the terminal 10 to the controller 11, under control of the controller 11. However, when only a signal received from the GPS satellite is used, an error may occur. Thus, the location information providing unit 17 may use round trip delay information, pilot phase file information, etc., which are transmitted from a base station, together with the GPS signal in order to obtain precise location information. Here, the base station has two functions. One of the functions is to mediate exchange of data between a communication center and the terminal 10, and the other function is to transmit data to be used to determine the location of the terminal 10, i.e., the location of a user. Thus, the location information providing unit 17 may determine the current location of the terminal 100 by receiving the location information described above or performing triangulation by receiving location information from three or more base stations to determine the precise location of the terminal 100.

The location information providing unit 17 may determine location information of the terminal 10 using a BLE method and an NFC tag method. That is, the location information providing unit 17 may use an indoor positioning system (IPS) to determine the location of an indoor user and check a fine change in the location of the user in a building. The IPS can be easily applied to most offline stores and the real world and the range of the application fields of the IPS is very wide. In particular, the location of the user may be recognized within a distance of 5 cm to 49 cm using data communication technology using BLE among IPS services. Also, the location information providing unit 17 may check location information using an NFC method. NFC is one of the RFID technologies and is a non-contact communication method using a frequency band of 13.56 MHz. Since NFC has a short communication distance, NFC is thus a relatively high-security local area communication method.

The controller 11 may be a process device that drives an operating system (OS) and various elements of the terminal 10. In particular, the controller 11 according to an embodiment of the present invention may access a beacon signal access region of a specific store to receive a beacon signal from the beacon device 20. Also, the controller 11 extracts beacon identification information from the beacon signal received from the beacon device 20. Here, the beacon identification information includes at least one among a UUID Of the beacon device 20, a major value representing a group to which the beacon device 20 belongs, and a minor value for identifying the beacon device 20 in the group to which the beacon device 20 belongs.

The controller 11 performs user authentication and searches for a list of beacon devices permitted after the user authentication. Also, the controller 11 selects a specific beacon device from the list of beacon devices and sets broadcasting information of the selected beacon device. Then, the controller 11 activates a communication function by setting wireless Internet client information with the service device 30.

According to another embodiment of the present invention, the controller 11 executes a beacon management application. Also, the controller 11 receives an access token from at least one beacon device, and identifies the beacon device 20. Thereafter, the controller 11 accesses the identified beacon device 20.

The controller 11 requests the service device 30 to provide a public key for the beacon device 20 while transmitting the access token and user information to the service device 30. Also, the controller 11 encrypts the access token using the public key received from the service device 30 and transmits the encrypted access token to the beacon device 20. Thereafter, the controller 11 transmits information for changing a predetermined beacon value to the beacon device 20, and disables the access to the beacon device 20 when the predetermined beacon value is changed.

Figure 3:
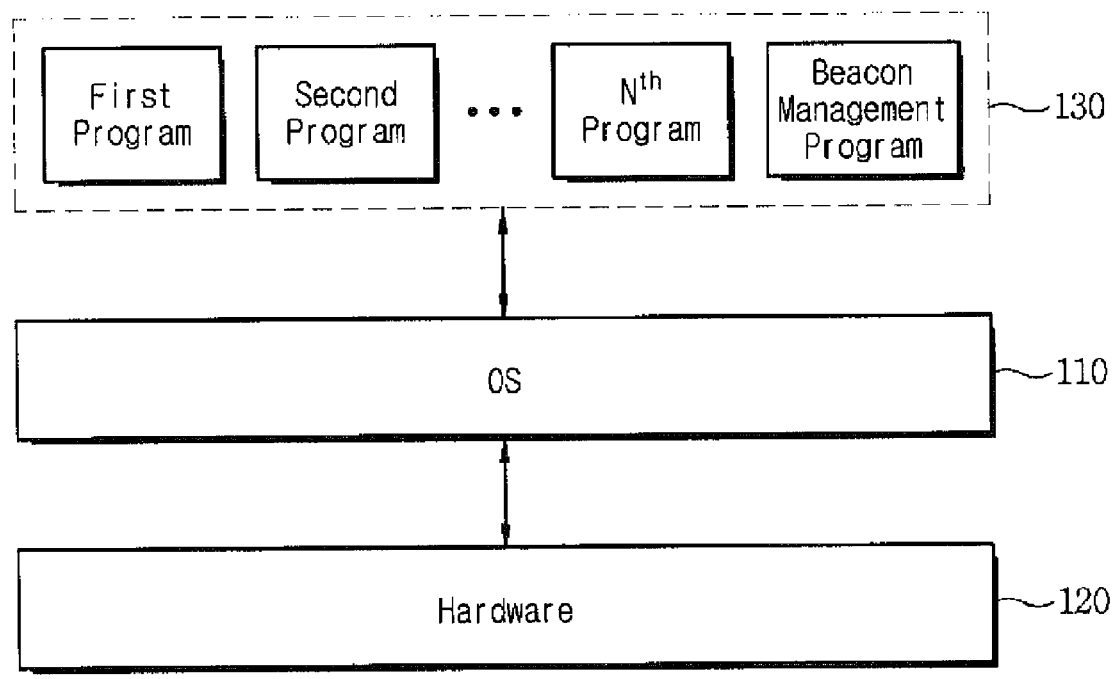
FIG. 3 is a diagram illustrating a platform structure of a terminal according to an embodiment of the present invention.

FIG. 3 is a diagram illustrating a platform structure of the terminal 10 according to an embodiment of the present invention.

Referring to FIG. 3, the terminal 10 has a platform structure including hardware 120, an OS 110, and an application 130.

The hardware 120 means a physical environment including a central processing unit (CPU) included in the terminal 10, a local area wireless communication chip for receiving a beacon signal, a communication chip for accessing the communication network 40, etc.

The OS 110 controls the hardware 120 and overall operations of the terminal 10. In general, the OS 110 may be installed by the manufacturing company of the terminal 10 or a mobile communication operator. The OS 110 provides an interface, e.g., an application programming interface (API), for controlling the hardware 120 to support the application 130.

The application 130 includes at least one program running on the OS 110, and may include a beacon management program. In detail, the application 130 may control the hardware 120 using the API provided from the OS 110. The beacon management program included in the application 130 performs the same operations as the controller 11 of the terminal 10 described above with reference to FIGS. 1 and 2. Also, the beacon management program included in the application 130 may receive a beacon signal from the beacon device 20 using the API provided by the OS 110, and be linked to the service device 30 to perform security reinforcement.

Figure 4:
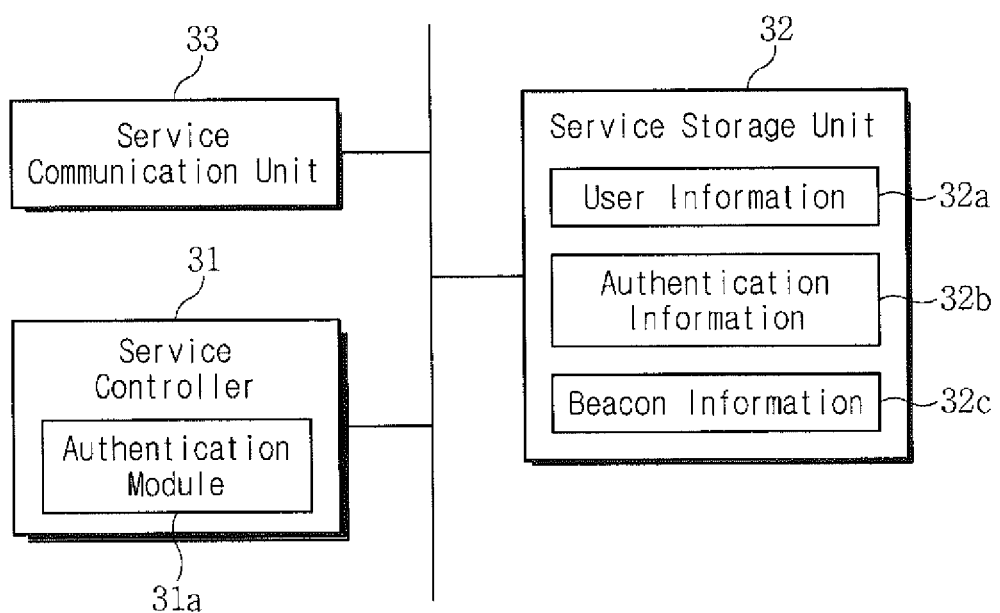
FIG. 4 is a block diagram of a service device according to an embodiment of the present invention.

FIG. 4 is a block diagram of a service device 30 according to an embodiment of the present invention.

Referring to FIG. 4, the service device 30 according to an embodiment of the present invention includes a service controller 31, a service storage unit 32, and a service communication unit 33. The service controller 31 includes an authentication module 31a. The service storage unit 32 includes user information 32a, authentication information 32b, and beacon information 32c.

The service communication unit 33 communicates with the terminal 10 and the beacon device 20 via the communication network 40 to transmit/receive data to be used for reinforcing security of the beacon device 20.

The service storage unit 32 stores various programs and data related to performing functions of the service device 30.

The service controller 31 may be a process device configured to drive an OS and various elements of the service device 30. In particular, the service controller 31 according to an embodiment of the present invention receives a request to transmit an access token from the beacon device 20. The service controller 31 generates an access token and transmits the access token to the beacon device 20, in response to the request, and receives at least one access token and user information from the terminal 10.

When the service controller 31 receives a signal requesting a public key for the beacon device 20, the service controller 31 generates the public key in response to the request. Then, the service controller 31 transmits the generated public key to the terminal 10.

The service device 30 configured as described above may be embodied as at least one service operating according to a server-based computing method or a cloud-based method. In particular, data required to perform security reinforcement using a beacon may be provided using a cloud computing function that may be permanently stored in a cloud computing device on the Internet. Here, the "cloud computing" means technology whereby virtual information technology (IT) resources (e.g., hardware resources, such as a server function, a storage function, a network function, etc., software, such as a database, security, a web server, etc., services, and data) are serviced on demand by applying Internet technology to a digital terminal (e.g., a desktop computer, a tablet computer, a notebook computer, a net book, a smartphone, etc.).

A memory installed in the terminal 10 and the service device 30 stores information therein. In one embodiment, the memory is a computer readable recording medium. The memory may be a volatile memory unit in one embodiment and may be a non-volatile memory unit in another embodiment. In one embodiment, a storage device is a computer readable recording medium. Examples of the storage device may include a hard disc device, an optical disc device, and other large-capacity storage devices in other various embodiments.

Although the structures of devices are exemplarily described in the present specification and drawings, the embodiments of functional operations and subject matters described in the present disclosure may be realized using different types of digital electronic circuits; computer software, firmware, or hardware including the structures disclosed herein or equivalents thereof; or a combination of at least one among them. The embodiments of the subject matters described in the present disclosure may be realized as at least one computer program product, in other words, at least one module regarding an encoded computer program command stored in a program storage medium so as to control an operation of a device according to the present invention or perform the operation of the device. The computer readable recording medium may be a storage device that can be read by a machine, a storage substrate that can be read by a machine, a memory device, a composition of a material that affects a propagated signal that can be read by a machine, or a combination of at least one among them.

Figure 5:
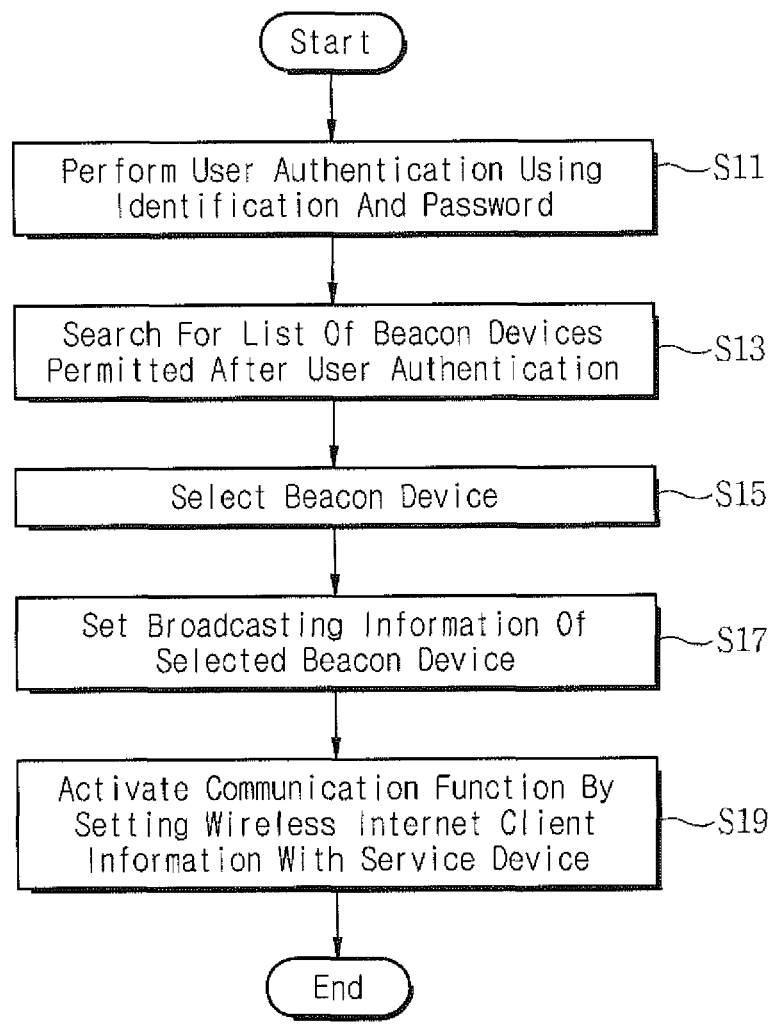
FIG. 5 is a flowchart of a method of reinforcing security of a beacon device according to an embodiment of the present invention.

FIG. 5 is a flowchart of a method of reinforcing the security of a beacon device according to an embodiment of the present invention. FIGS. 10A to 10D are diagrams illustrating methods of reinforcing the security of a beacon device according to embodiments of the present invention.

Referring to FIG. 5, in operation S11, the terminal 10 performs user authentication to reinforce the security of a beacon device according to an embodiment of the present invention. In this case, user authentication may be performed using identification and a password.

In operation S13, the terminal 10 searches for a list of beacon devices permitted after the user authentication. In operation S15, the terminal 10 selects a specific beacon device from the list of beacon devices.

In operation S17, the terminal 10 sets broadcasting information of the selected beacon device. In operation S19, the terminal 10 activates a communication function by setting wireless Internet client information with the service device 30.

For example, as illustrated in FIGS. 10A to 10D, the terminal 10 may communicate with the service device 30 using a beacon management application, perform user authentication, and search for a list of permitted beacon devices. That is, the terminal 10 performs user authentication using identification and password information, and searches for a list of beacon devices 20 permitted after the user authentication. In this case, the terminal 10 may call an API of the service device 30.

Also, the terminal 10 sets broadcasting information of the selected beacon device 20, and may transmit the set broadcasting information to the beacon device by establishing BLE communication. Also, the terminal 10 may activate a function of communicating with the service device 30 by setting wireless communication client (Wi-Fi client) information.

Figure 6:
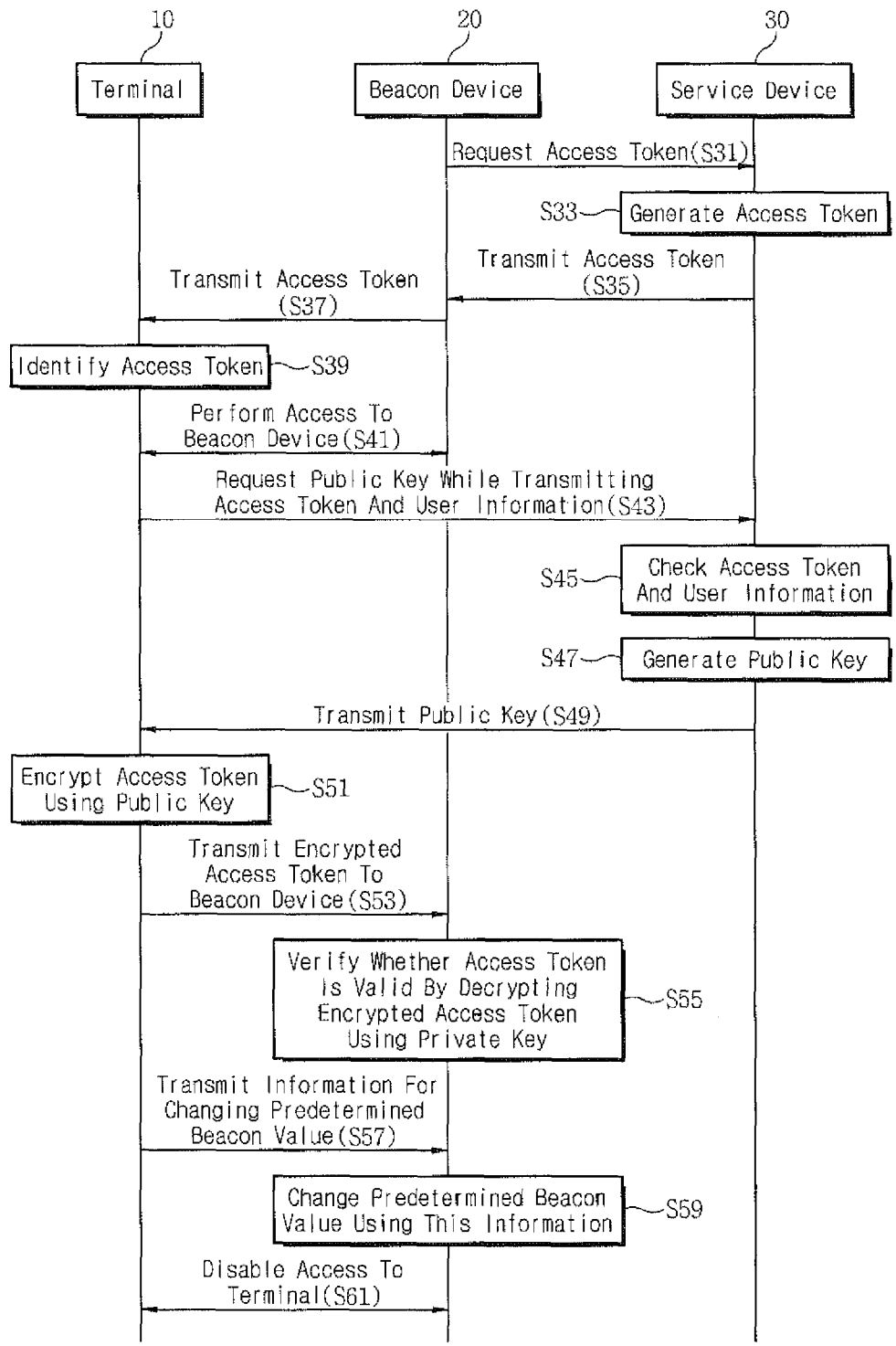
FIG. 6 is a data flowchart of a method of reinforcing security of a beacon device according to another embodiment of the present invention.

FIG. 6 is a data flowchart of a method of reinforcing the security of a beacon device according to another embodiment of the present invention.

Referring to FIG. 6, in a method of reinforcing the security of a beacon device according to another embodiment of the present invention, in operation S31, the beacon device 20 requests the service device 30 to transmit an access token. In operations S33 and S35, when the service device 30 receives the request to transmit an access token from the beacon device 20, the service device 30 generates the access token and transmits the access token to the beacon device 20, in response to the request.

In operation S37, the beacon device 20 transmits the received access token to the terminal 10. In operation S39, the terminal 10 identifies the access token received from the beacon device 20. Then, in operation S41, the terminal 10 accesses the beacon device 20.

In operation S43, the terminal 10 requests the service device 30 to transmit a public key for the beacon device 20 while transmitting the access token and user information to the service device 30. Here, the access token includes information required for the terminal 10 and the beacon device 20 to log in.

In operations S45 and S47, the service device 30 checks the access token and the user information received from the terminal 10, and generates a public key in response to the request. In operation S49, the service device 30 transmits the generated public key to the terminal 10.

In operation S51, the terminal 10 encrypts the access token using the public key received from the service device 30. In operation S53, the terminal 10 transmits the encrypted access token to the beacon device 20. In operation S55, the beacon device 20 verifies whether the access token is valid by decrypting the encrypted access token using a private key.

In operation S57, the terminal 10 transmits information for changing a predetermined beacon value to the beacon device 20. In operation S59, the beacon device 20 changes the predetermined beacon value using this information received from the terminal 10. Here, the beacon device 20 may change the predetermined beacon value such as a major value, a minor value, transmission power, an advertisement period, Wi-Fi client information, etc. Then, in operation S61, the beacon device 20 disables the access to the terminal 10 when the predetermined beacon value is changed.

Figure 7:
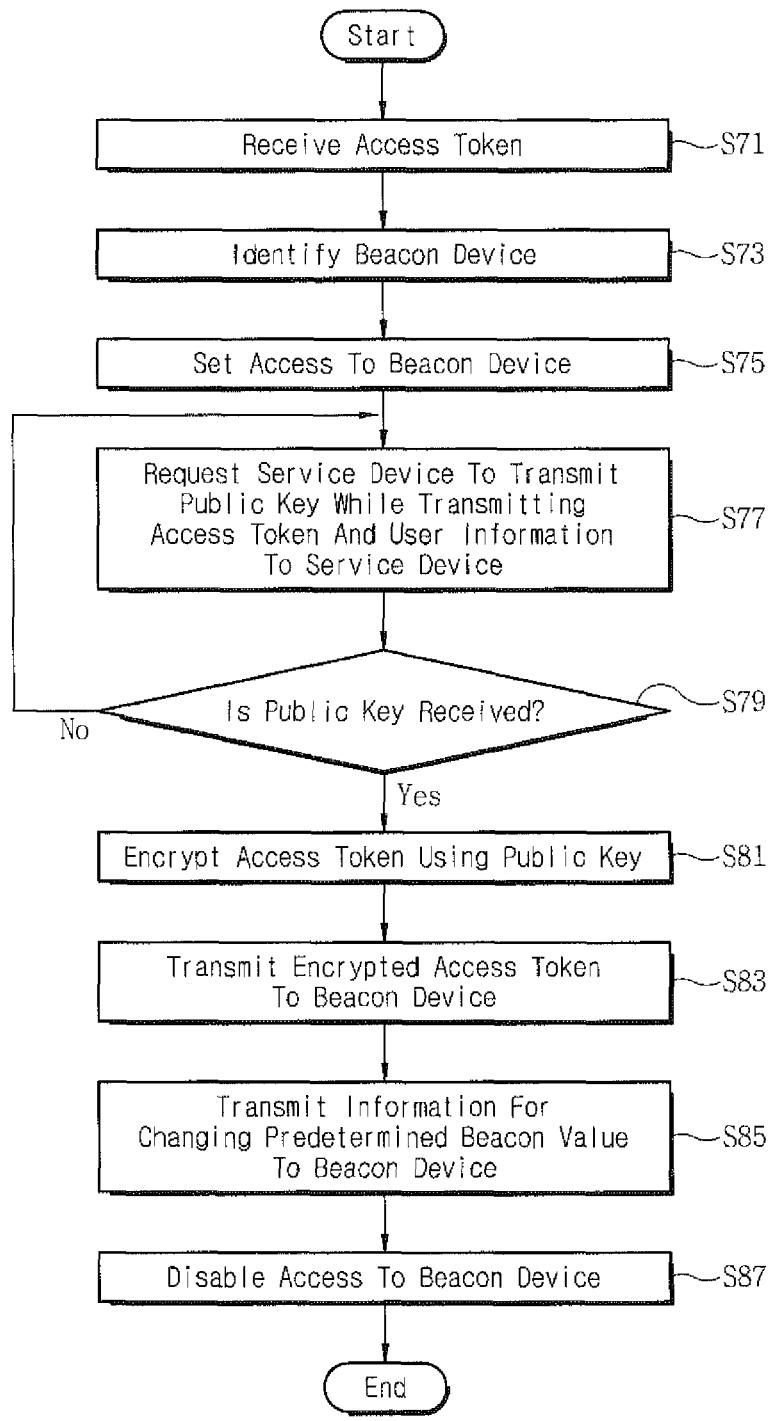
FIG. 7 is a flowchart of a method of operating a terminal according to an embodiment of the present invention.

FIG. 7 is a flowchart of a method of operating a terminal according to an embodiment of the present invention.

Referring to FIG. 7, in operation S71, the terminal 10 according to an embodiment of the present invention executes a beacon management application and receives an access token from the beacon device 20.

In operations S73 and S75, the terminal 10 identifies the beacon device 20 and sets access to the beacon device 20. In operation S77, the terminal 10 requests the service device 30 to transmit a public key for the beacon device 20 while transmitting an access token and user information to the service device 30. Here, the access token includes information required for the terminal 10 and the beacon device 20 for log in.

In operation S79, the terminal 10 determines whether the public key is received from the service device 30. In operation S81, when the public key is received from the service device 30, the terminal 10 encrypts the access token using the public key received from the service device 30. In operation S83, the terminal 10 transmits the encrypted access token to the beacon device 20.

In operation S85, the terminal 10 transmits information for changing a predetermined beacon value to the beacon device 20. In operation S87, the terminal 10 disables the access to the beacon device 20 when the predetermined beacon value is changed.

Figure 8:
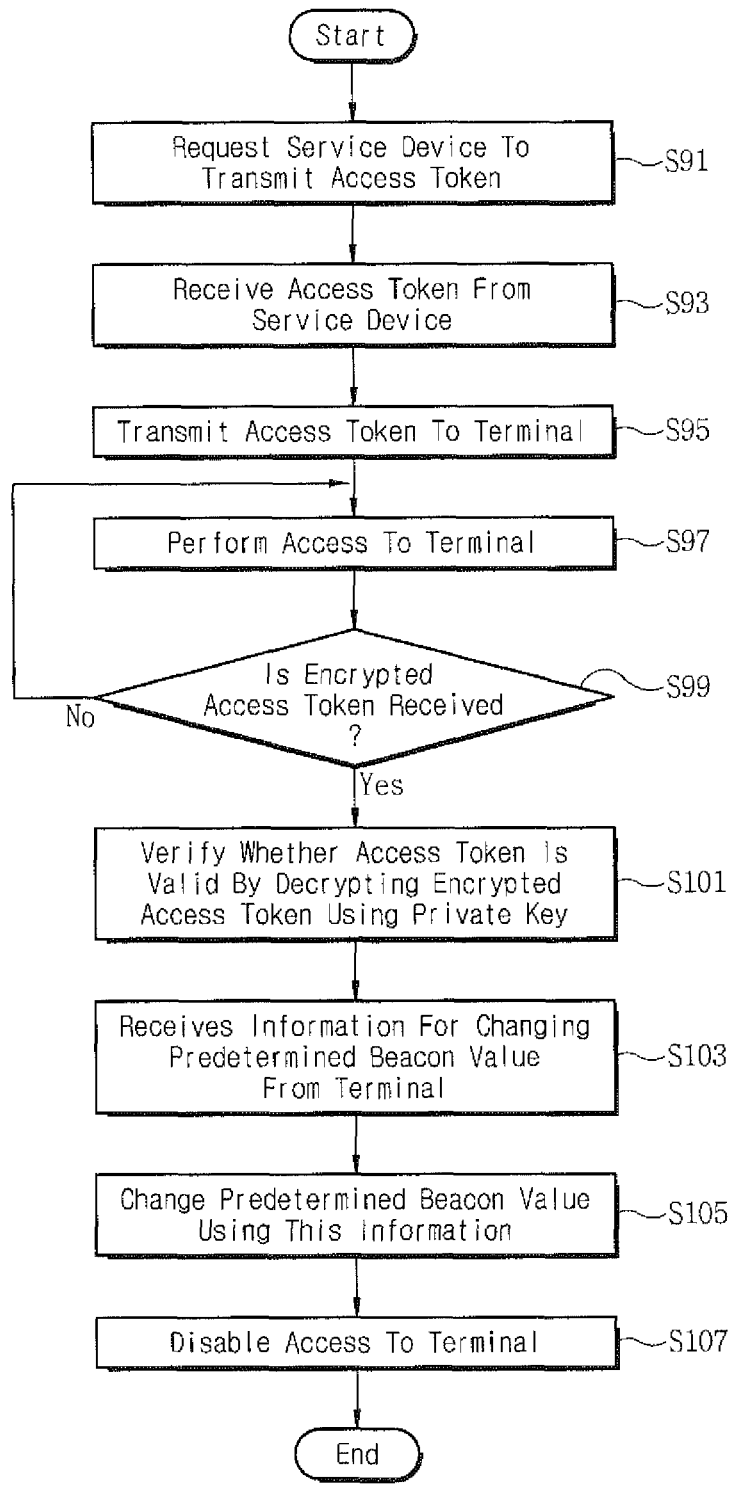
FIG. 8 is a flowchart of a method of operating a beacon device according to an embodiment of the present invention.

FIG. 8 is a flowchart of a method of operating a beacon device according to an embodiment of the present invention.

Referring to FIG. 8, in operations S91 and S93, the beacon device 20 according to an embodiment of the present invention requests the service device 30 to transmit an access token, and receives the access token from the service device 30. In operation S95, the beacon device 20 transmits the access token to the terminal 10. In operation S97, the beacon device 20 accesses the terminal 10.

In operation S99, the beacon device 20 determines whether an encrypted access token is received. In operation S101, when the encrypted access token is received, the beacon device 20 verifies whether the access token is valid by decrypting the encrypted access token using a private key.

In operation S103, the beacon device 20 receives information for changing a predetermined beacon value from the terminal 10. In operation S105, the beacon device 20 changes the predetermined beacon value using this information. Here, the beacon device 20 may change the predetermined beacon value such as a major value, a minor value, transmission power, an advertisement Period, Wi-Fi client information, etc. Thereafter, in operation S107, the beacon device 20 disables the access to the terminal 10 when the predetermined beacon value is changed.

Figure 9:
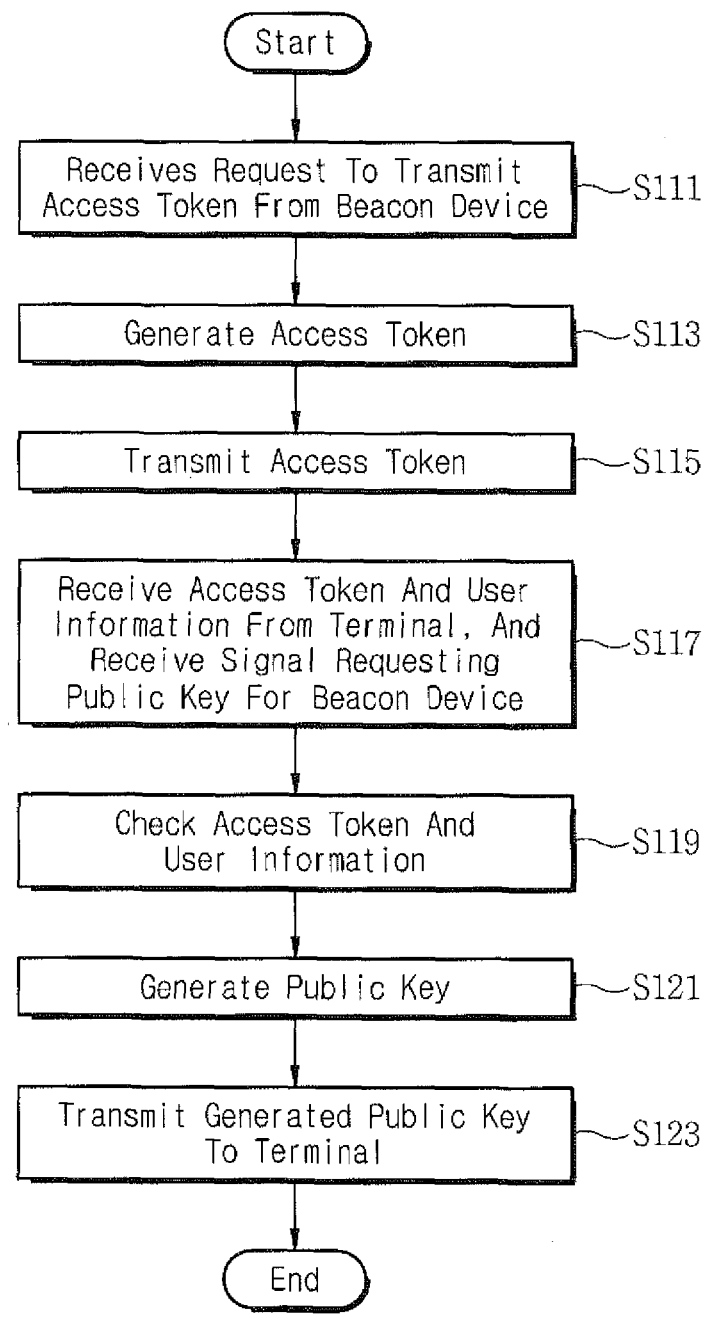
FIG. 9 is a flowchart of a method of operating a service device according to an embodiment of the present invention.
Figure 10A:
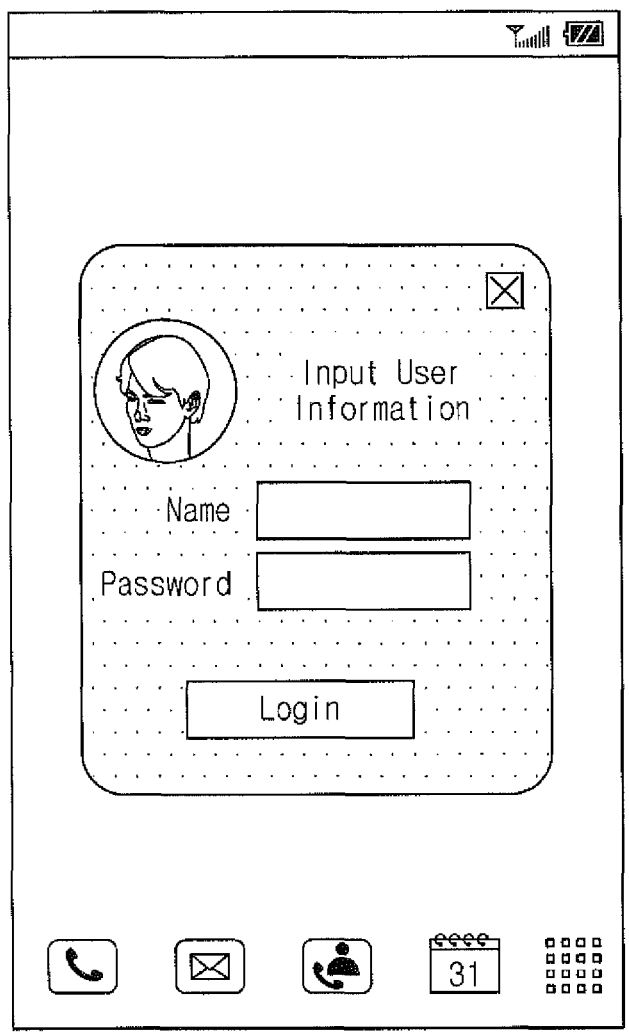
FIGS. 10A to 10D are diagrams illustrating methods of reinforcing security of a beacon device according to embodiments of the present invention.
Figure 10B:
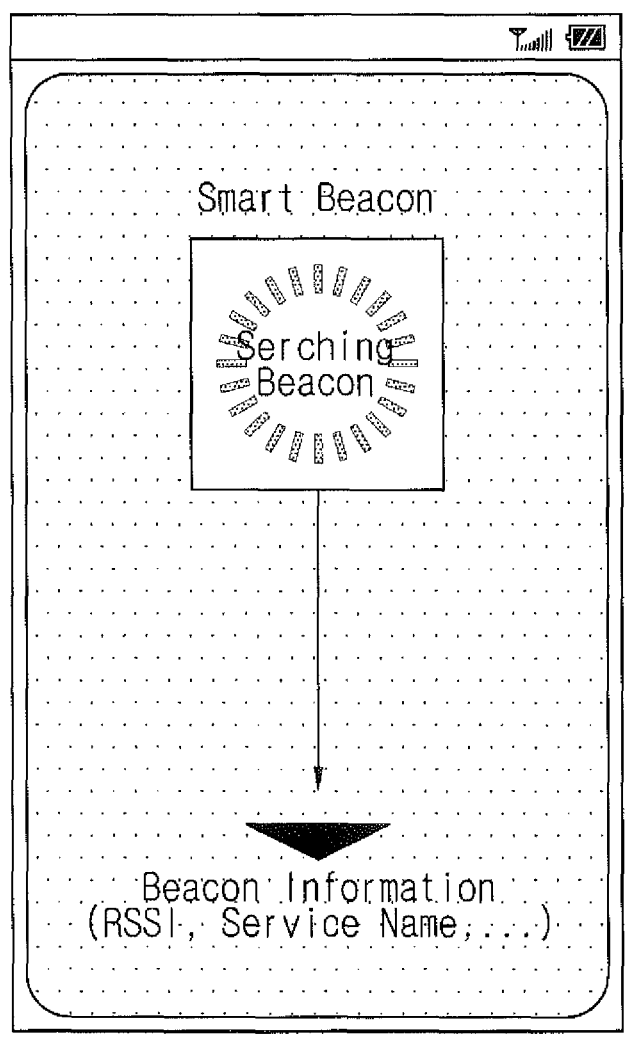
Figure 10C:
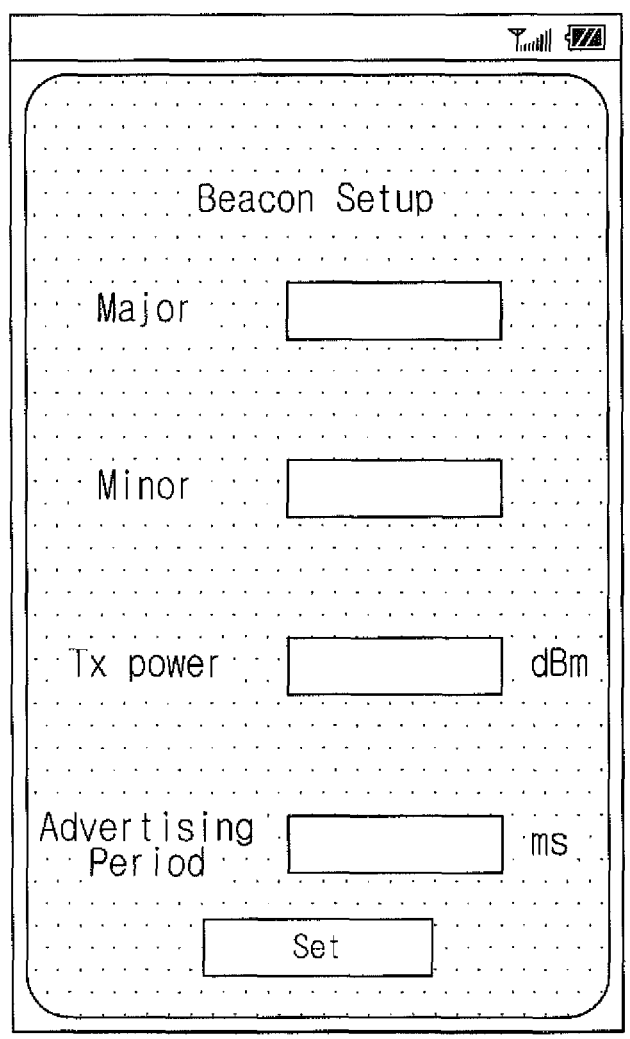
Figure 10D:
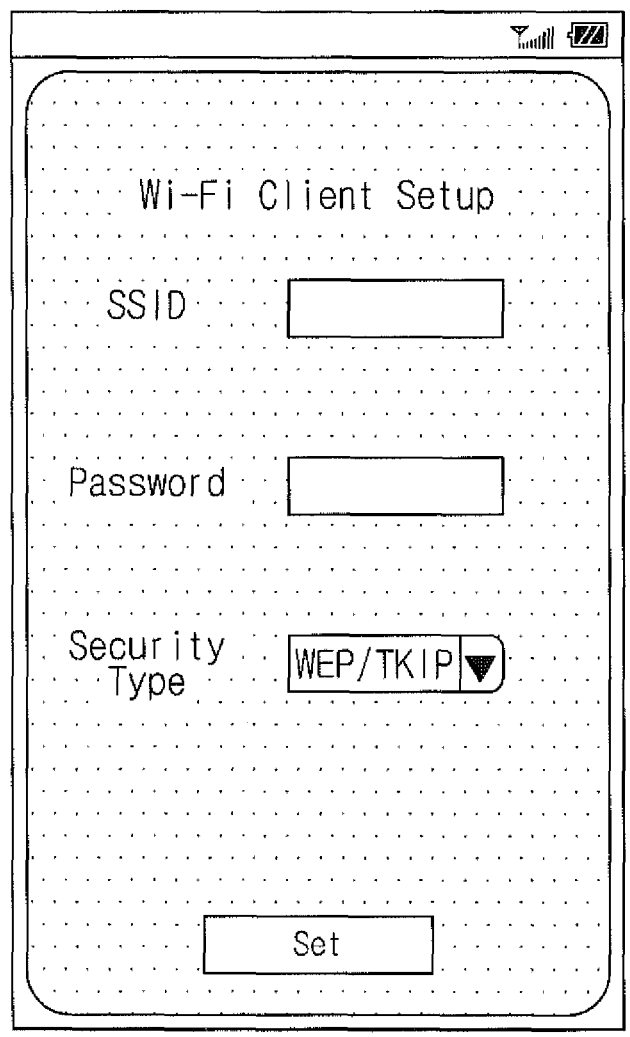

FIG. 9 is a flowchart of a method of operating a service device according to an embodiment of the present invention.

Referring to FIG. 9, in operation S111, the service device 30 according to an embodiment of the present invention receives a request to transmit an access token from the beacon device 20. In operations S113 and S115, the service device 30 generates the access token and transmits the access token to the beacon device 20, in response to the request.

In operation S117, the service device 30 receives at least one access token and user information from the terminal 10, and receives a signal requesting a public key for the beacon device 20.

In operations S119 and S121, the service device 30 checks the at least one access token and the user information, and generates the public key in response to the request. In operation S123, the service device 30 transmits the generated public key to the terminal 10.

According to the one or more embodiments of the present invention, the stability of security may be increased by performing user authentication and encrypting data during communication with a beacon device. Thus, after the beacon device and a terminal are connected, identification information of the beacon device may be changed by establishing BLE communication. Also, a user may be exactly identified using a beacon signal and authenticated, thereby conveniently providing additional services. Also, the location of a terminal may be determined using a BLE beacon signal to reduce resources consumed to measure the location of the terminal, and a service device may simplify logic for extracting information to be applied to a service. Also, when various information is provided to a client's terminal that receives an identifier of a beacon device broadcast from the beacon device, information provided to the client's terminal may be prevented from being changed by an unauthorized person. That is, the security of the beacon device may be reinforced to enable only an authorized user to change information of the beacon device, thereby blocking access to the beacon device by a malicious person and providing a safe service. Accordingly, the present invention is industrially applicable, since it is expected to be marketable and to make a high profit and it is obvious that the present invention can be practically accomplished.

The various technologies described in the present disclosure may be embodied using a digital electronic circuit system, computer hardware, firmware, software, or a combination thereof. The various technologies may be also embodied as a computer program embodied using a computer program product, i.e., an information carrier (e.g., a machine readable storage medium (a computer readable recording medium)) or a radio signal, so as to perform processing by operating a data processing device, e.g., a programmable processor, a computer, or a plurality of computers, or control an operation of the data processing device. A computer program such as the computer program(s) described above may be recorded in an arbitrary programming language including compiled or interpreted languages, and expanded in an arbitrary form including an individual program, a module, a component, a subroutine, or other units that can be used in a computing environment. The computer program may be distributed to be executed by one computer or a plurality of computers in one site or may be divided and distributed over a plurality of sites and expanded to be connected via a communication network.

The operations of a method may be performed by at least one programmable processor configured to execute a computer program to perform operations by executing 'on' input data and outputting an output. The operations of a method may be performed by as a special-purpose logic circuit system, e.g., a field programmable gate array (FPGA) or an application-specific integrated circuit (ASIC), and an apparatus may be embodied as the single-purpose logic circuit system.

For example, processors appropriate for executing a computer program include both a general-purpose microprocessor and a special-purpose microprocessor, and at least one processor of an arbitrary type of digital computer. In general, a processor may receive commands and data from a read only memory, a random access memory, or both of them. The elements of a computer may include at least one processor for executing commands, and at least one memory device for storing commands and data. In general, a computer may include at least one large-capacity storage device for storing data (e.g., magnetic disks, magneto-optical discs, or optical discs) or be combined with the at least one large-capacity storage device to receive data therefrom, transmit data thereto, or transmit data thereto and receive data therefrom. Examples of information carriers appropriate for embodying computer program commands and data include semiconductor memory devices such as magnetic media (e.g., a hard disc, a floppy disk, a magnetic tape, etc.), optical media (e.g., a compact disk-read only memory (CD-ROM), a digital video disk (DVD), etc.), magneto-optical media (e.g., a floptical disk), a ROM, a random access memory (RAM), a flash memory, an erasable programmable ROM (EPROM), an electrically erasable programmable ROM (EEPROM), etc. A processor and a memory may be supplemented with or included in a special-purpose logic circuit system.

Although the details of the exemplary embodiments are described in the present disclosure, they should not be construed as limiting an invention or the scope of an invention to be claimed. Rather, the details of these embodiments should be understood as unique features of exemplary embodiments of a specific invention. The unique features described in the present disclosure may be combined in a single embodiment according to the context of an individual embodiment. On the contrary, various features described according to the context of a single embodiment may be also embodied in a plurality of embodiments individually or in an appropriate sub-combination. Furthermore, although the features may be realized in a particular combination and described as originally claimed, at least one feature according to a claimed combination may be excluded from this combination in some cases and the claimed combination may be changed into a sub-combination or a modification of the sub-combination.

Similarly, although operations are illustrated in a specific order in the drawings, it should not be construed that the operations are performed in the specific order or a sequential order or all of the operations are performed to obtain a desired result. In a particular case, multitasking and parallel processing may be desirable. Also, although various system components may be separated in the embodiments set forth herein, the separation should not be construed as being required in all embodiments. In general, the program components and systems described above may be integrated into a single software product or packaged into multiple software products.

The embodiments set forth in the present specification and drawings are merely examples provided to help understand the present invention and are not intended to restrict the scope of the present invention. It would be obvious to those of ordinary skill in the art that the above exemplary embodiments are to cover all modifications, equivalents, and alternatives falling within the scope of the invention.

In this specification, exemplary embodiments of the present invention have been classified into the first, second and third exemplary embodiments and described concisely. However, respective steps or functions of an exemplary embodiment may be combined with those of another exemplary embodiment to implement still another exemplary embodiment of the present invention.

What is claimed is:

1. A terminal comprising:
    a transceiver configured to communicate with at least one beacon device and a service device to transmit or receive data required to reinforce security of a beacon device; and
    a controller configured to control a beacon management application to be executed, an access token to be received from the beacon device, a public key for the beacon device to be requested while identifying the beacon device and transmitting the access token and user information to the service device, the access token to be encrypted using the public key received from the service device, and the encrypted access token to be transmitted to the beacon device,
    wherein after the encrypted access token is transmitted to the beacon device, the controller transmits the information for changing a predetermined beacon value to the beacon device, so as to change the predetermined beacon value after verifying a validation of the access token by decrypting the encrypted access token using a private key in the beacon device.

2. The terminal of claim 1, wherein the controller performs user authentication, searches for a list of at least one beacon device permitted after the user authentication, selects a specific beacon device from the list of at least one beacon device, sets broadcasting information of the selected beacon device, and activates a communication function by setting wireless internet client information with the service device.

3. The terminal of claim 1, wherein the transceiver receives a beacon signal using local area wireless communication.

4. The terminal of claim 1, wherein the controller identifies at least one among a universally unique identifier (UUID) of the beacon device, a major value representing a group to which the beacon device belongs, and a minor value identifying the beacon device in the group to which the beacon device belongs so as to reinforce security of the beacon device.

5. The terminal of claim 1, wherein the controller accesses the beacon device after the beacon device is identified.

6. The terminal of claim 1, the controller disables the access to the beacon device when the predetermined beacon value is changed.

7. A system for reinforcing security of a beacon device, comprising:
    a terminal configured to execute a beacon management application, receive an access token from a beacon device, request a service device to transmit a public key for the beacon device while identifying the beacon device and transmitting the access token and user information to the service device, encrypt the access token using the public key received from the service device, and transmit the encrypted access token to the beacon device;
    the beacon device configured to request the service device to transmit an access token, receive the access token from the service device, transmit the received access token to the terminal, determine whether an encrypted access token is received from the terminal, and verify whether the access token is valid by decrypting the encrypted access token using a private key when the encrypted access token is received; and
    the service device configured to receive a request to transmit an access token from the beacon device, generate the access token and transmit the access token to the beacon device in response to the request, receive at least one access token and user information from the terminal, and generate a public key for the beacon device and transmit the generated public key to the terminal in response to a request when a signal requesting the public key for the beacon device is received,
    wherein the beacon device receives information for changing a predetermined beacon value from the terminal, changes the predetermined beacon value based on this information.

8. The system of claim 7, wherein the beacon device disables the access to the terminal when the predetermined beacon value is changed.

9. The system of claim 7, wherein the beacon device receives information for changing a predetermined beacon value from the terminal, changes the predetermined beacon value based on this information, and disables the access to the terminal when the predetermined beacon value is changed.

* * * * *